United States Patent [19]

Heflin

[11] 4,135,075
[45] Jan. 16, 1979

[54] RESISTANCE WELDING APPARATUS AND METHOD

[75] Inventor: Robert L. Heflin, Richmond, Va.

[73] Assignee: Reynolds Metals Company, Richmond, Va.

[21] Appl. No.: 832,589

[22] Filed: Sep. 12, 1977

[51] Int. Cl.² ............................................. B23K 11/10
[52] U.S. Cl. .......................... 219/78.14; 219/86.41; 219/91.1; 219/111; 219/118
[58] Field of Search ................ 219/78.14, 61.12, 91.1, 219/86.41, 98, 99, 111, 118

[56] References Cited

U.S. PATENT DOCUMENTS

| | | | |
|---|---|---|---|
| 1,804,059 | 5/1931 | Miller | 219/78.14 |
| 2,491,479 | 12/1949 | Dash | 219/98 |
| 3,278,720 | 10/1966 | Dixon | 219/78.14 X |
| 3,487,195 | 12/1969 | Denis | 219/111 X |
| 3,505,495 | 4/1970 | Mitchell | 219/99 |
| 3,701,879 | 10/1972 | Gstohl | 219/98 X |
| 3,992,602 | 11/1976 | Ashton | 219/78.14 |

*Primary Examiner*—Richard R. Kucia
*Attorney, Agent, or Firm*—Glenn, Lyne, Girard, Clark and McDonald

[57] ABSTRACT

In combination with a resistance spot welding machine for welding superimposed electrically conductive members an improved apparatus for and method of cleaning welding electrodes and associated portions of the members to be welded are provided utilizing inert gas cooperating with electrical circuitry such that a sequential cleaning of each electrode and its portions are provided which is self starting and ending as a function of the presence of sufficient inert gas.

20 Claims, 4 Drawing Figures

RESISTANCE WELDING APPARATUS AND METHOD

BACKGROUND OF THE INVENTION

This invention relates to resistance welding and in particular to resistance spot welding of superimposed electrically conductive members.

U.S. Pat. No. 3,992,602, the disclosure of which is incorporated herein by reference, discloses resistance spot welding of electrically conductive members, such as aluminum members, wherein an apparatus and method are provided and include cleaning means which utilize inert gas between successive welding operations to effect cleaning of the welding electrodes as well as those portions of the members being welded which are contacted by the electrodes. With the apparatus and method disclosed in this patent approximately 5-7 spot welds per minute are provided and this is due to the inherent limitations of the cooperating components and method.

SUMMARY OF THE INVENTION

This invention is an improvement over the apparatus and method disclosed in the above patent and provides in combination with a resistance spot welding machine for welding superimposed electrically conductive members an improved apparatus for and method of cleaning welding electrodes and associated portions of the members to be welded utilizing inert gas cooperating with electrical circuitry such that a sequential cleaning of each electrode and its portions are provided which is self starting and ending as a function of the presence of sufficient inert gas whereby quality spot welds are provided at the rate of roughly 25 welds per minute and more.

More particularly, this invention provides in a resistance spot welding machine having two opposed welding electrodes; means for relatively moving said electrodes in close proximity to and against a pair of superimposed members to be welded; an electrical welding circuit connected to said electrodes for inducing an electric current across said electrodes with each electrode disposed against a portion of an outer exposed area of an associated one of said members; and means for cleaning each of said portions and electrode associated therewith including first means providing inert gas in a first zone between one of said portions and its electrode and second means providing inert gas in a second zone between the other of said portions and its electrode, and an electrical cleaning circuit operatively connected to said providing means; the imrpovements which comprises apparatus comprising a part of said cleaning means for sequentially cleaning said electrodes and said portions by alternately providing controlled bathing flow of inert gas to said first zone and then to said second zone with said electrical cleaning circuit activated causing cleaning action in each zone to be self starting and ending as a function of the presence of sufficient inert gas therein.

Further details and advantages of the invention will become apparent as the following description of the embodiments thereof in the accompanying drawings proceed.

BRIEF DESCRIPTION OF THE DRAWINGS

The accompanying drawings show a present preferred embodiment of the invention, in which.

DESCRIPTION OF ILLUSTRATED EMBODIMENTS

Figure 1:
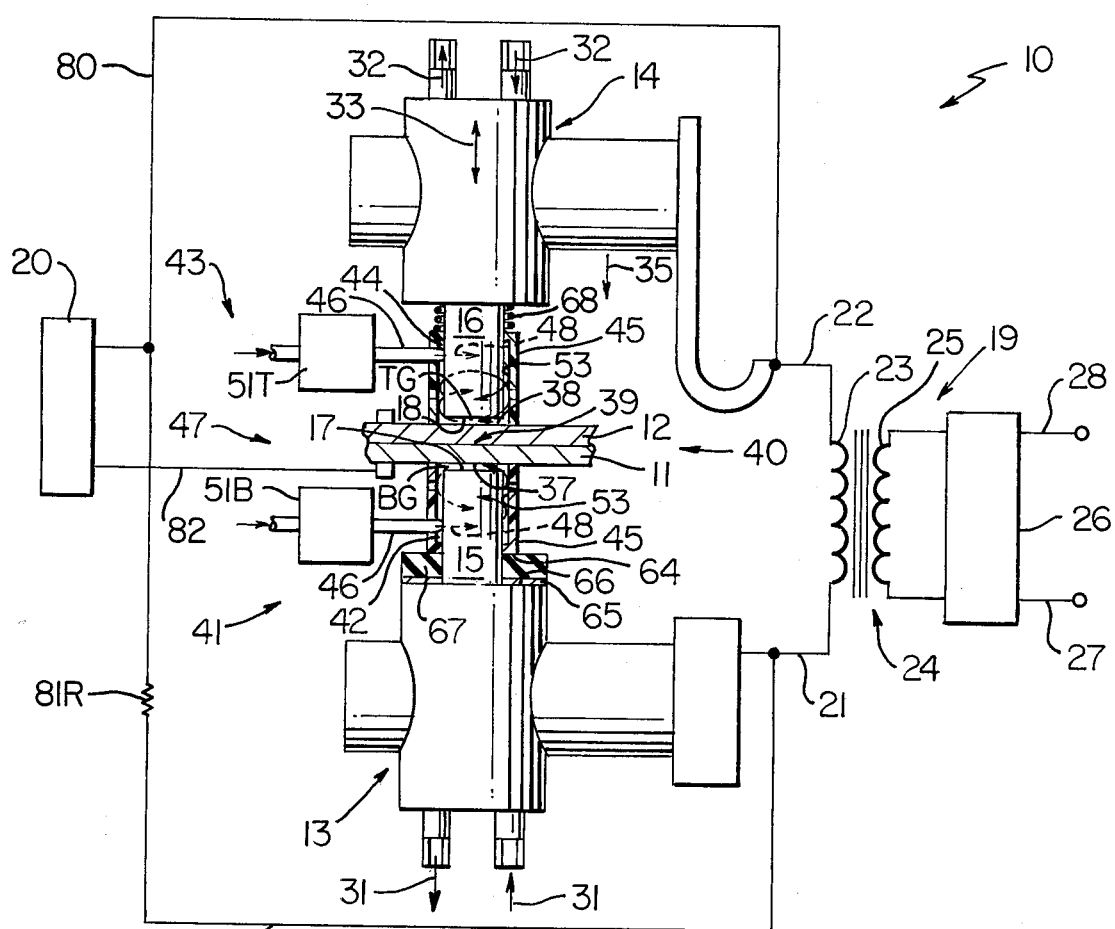
FIG. 1 is a primarily schematic view with parts in elevation and parts in cross section illustrating one exemplary embodiment of the apparatus and method of this invention particularly adapted for spot welding a pair of superimposed electrically conductive members.

Reference is now made to FIG. 1 of the drawings which illustrates one exemplary embodiment of the apparatus and method of this invention utilized in connection with a resistance spot welding machine which is designated generally by the reference numeral 10 and is of the type which is well known in the art. The machine 10 is particularly adapted for joining a pair of superimposed electrically conductive members 11 and 12 by spot welding such members. Each of the members 11 and 12 of this example is made of an aluminous material; however it is to be understood that such members may be made of suitable compatible electrically conductive materials.

The machine 10 has an assembly which is popularly referred to in the art as a horn 13 and is suitably supported at a fixed position. The machine 10 also has an assembly which is movable and will be referred to as a movable horn 14. The fixed horn 13 and movable horn 14 carry opposed welding electrodes 15 and 16 respectively, and, such electrodes 15 and 16 have work-engaging or working surfaces 17 and 18 respectively which are particularly adapted to engage their respective members 11 and 12 to weld same.

Figure 4:
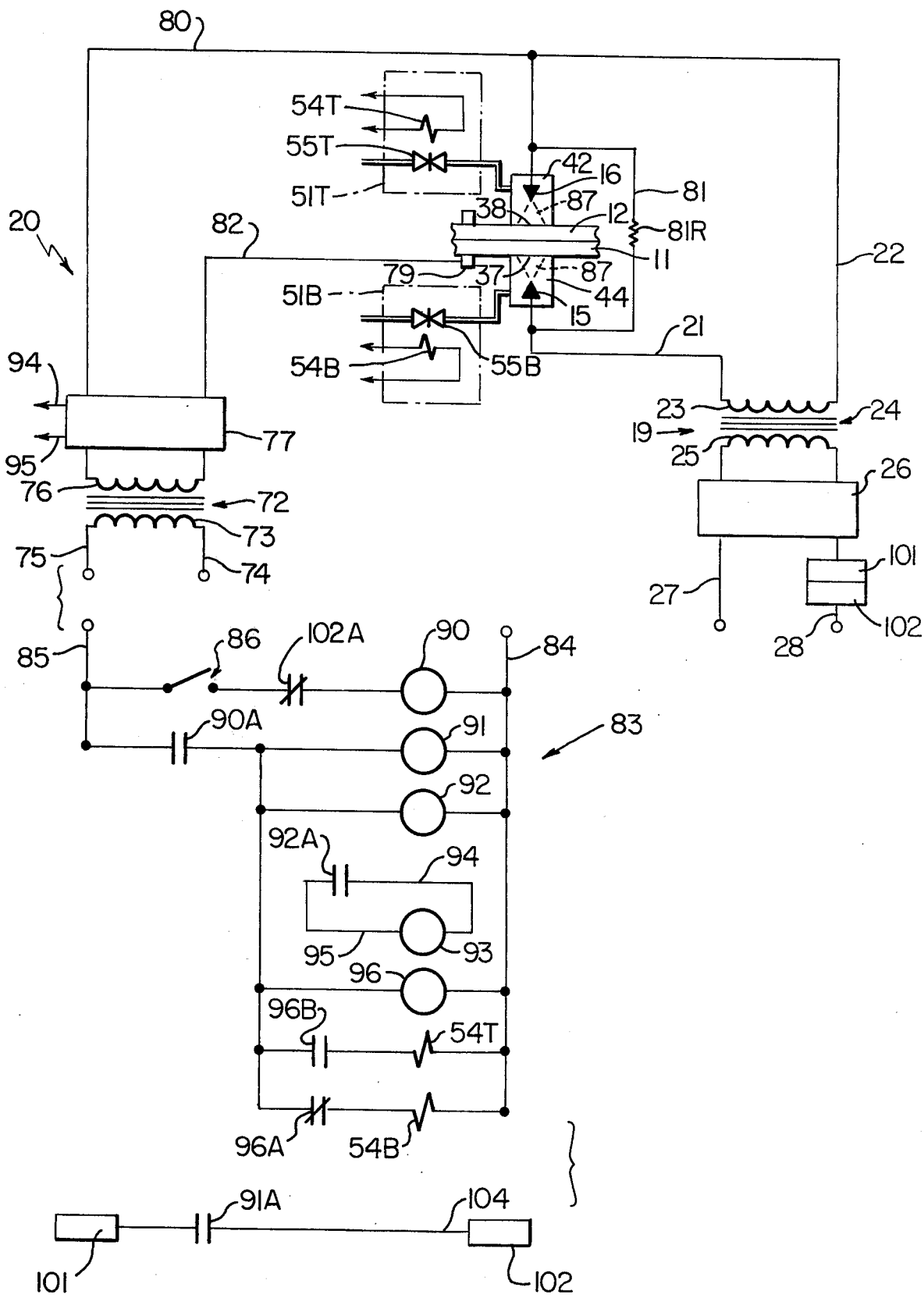
FIG. 4 is a schematic presentation primarily of key electrical and inert gas providing components of the apparatus and method of FIG. 1.

The machine 10 has an electrical welding circuit 19 a portion of which is shown in FIGS. 1 and 4 and what will be referred to as an electrical cleaning circuit which is indicated schematically by a block 20 in FIG. 1. The cleaning circuit 20 will be described in more detail subsequently.

The welding circuit 19 comprises a pair of electrical leads 21 and 22 suitably connected between the fixed horn 13 and movable horn 14 and secondary wiring turns 23 of a transformer 24 which has primary turns 25. The primary turns 25 are connected through a welding control circuit 26 for the welding circuit 19 and leads 27-28 to a source of alternating current which is suitable for spot welding. The welding control circuit 26 may be of any suitable construction and is indicated schematically by the rectangular block 26.

The machine 10 also has means for internally cooling the electrodes 15 and 16. Although any suitable means may be used for this purpose the machine 10 has means for circulating cooling water internally of the electrodes 15 and 16 and such means are indicated schematically by arrows 31 for the fixed horn 13 and arrows 32 for the movable horn 14.

The machine 10 has suitable means indicated schematically by the double arrow 33 for moving the movable horn 14 whereby the moving means 33 comprises means for relatively moving the electrodes 15 and 16 in close proximity to and against the pair of superimposed members 11 and 12.

During a typical spot welding operation by the machine 10 the movable horn 14 and its electrode 16 are moved downwardly toward the electrode 15, as indicated by the arrow 35, and the work engaging surfaces or tips 17 and 18 of respective electrodes 15 and 16 are arranged in contact with associated outer exposed surface area portions 37 and 38 (FIG. 1) respectively of members 11 and 12. With the surface 17 and 18 held against associated portions 37 and 38 an electric current is provided by the welding circuit 19 through the transformer 24 thereof. The output from the transformer 24 results in current flow across the electrodes 15 and 16 and through the members 11 and 12 whereby members 11 and 12 are locally heated so as to fuse the faying surfaces of such members at locations thereof indicated at 39 in FIG. 1, intermediate the outer exposed area portions 37 and 38 and in a manner which is known in the art.

The machine 10 has means 40 for cleaning the portions 37 and 38 and their respective electrodes 15 and 16 and such cleaning means 40 comprises first means designated generally by the reference numeral 41 for providing inert gas in a first zone 42 between portion 37 and its electrode 15 and second means designated generally by the reference numeral 43 for providing inert gas in a second zone 44 between portion 38 and its electrode 16. Each of the means 41 and 43 will be described in detail subsequently.

The electrical cleaning circuit 20 mentioned above comprises the cleaning means 40 and is operatively connected to the first and second providing means 41 and 43 to provide cleaning of electrodes 15 and 16 and the surfaces 37 and 38 of members 11 and 12 respectively associated therewith.

The machine 10 of this invention has an improvement which comprises apparatus or means 47 comprising a part of the cleaning means 40 and such apparatus or means 47 provides sequential cleaning of the electrodes 15-16 and of portions 37 and 38 by alternating controlled bathing flow of inert gas, indicated by arrows 48 in FIG. 1, to the first zone 42 and then to the second zone 44 with the electrical cleaning circuit activated (as will be described in detail subsequently) causing cleaning action in each zone 42 and 44 to be self starting and ending as a function of the presence of sufficient inert gas 48 in the particular zone.

Stated another way the improvement in the machine 10 may be considered as comprising means or apparatus 47 comprising a part of the cleaning means 40 for sequentially cleaning the electrodes 15-16 and member portions 37 and 38 by alternating the flow of inert gas first between one electrode, 15 in this example and portion 37 to be gripped or contacted thereby, and then between the other electrode, 16 and portion 38 to be gripped thereby, with the electrical cleaning circuit 20 activated. It will be appreciated that the electrode 16 and its area portion may be cleaned first if desired.

As mentioned above, each of the first and second providing means 41 and 43 of the cleaning means 40 includes a housing member or housing 45 surrounding its electrode and an inert gas supply conduit 46 connected to each housing 45. An electric solenoid operated valve is operatively connected in each supply conduit 46 and, for simplicity and to correspond to the presentation in the drawings the valve associated with the bottom electrode 15 will be designated 51B and the valve associated with the top electrode 16 will be designated 51T.

Each conduit 46 is supplied with inert gas 48 from a suitable supply source, not shown; and, each valve 51B and 51T controls flow of inert gas 48 therethrough in a manner to be subsequently described. Each housing member 45 is a tubular member having a cylindrical inside surface 53 and a plurality of outlet openings 52 (FIGS. 2-3) extending therethrough which enable controlled bathing flow of inert gas 48 through its zone, either 42 or 44. The controlled bathing flow is provided by inert gas flowing between a housing member 45 and its associated electrode by allowing bleeding of gas 48 through openings 52 following provision thereof through an associated valve either 51B or 51T.

Reference was made previously to sequential cleaning by alternating controlled bathing flow of inert gas 48 to zone 42 and then to the second zone 44. The first zone 42 disclosed herein is defined by that volume disposed or defined between the outside surface of the electrode 15 including its work-engaging surface 17, the inside surface 53 of the bottom housing 45, and the surface area portion 37 of the member 11 with bottom housing 45 against member 11. Similarly, the second zone 44 disclosed herein is defined by that volume disposed or defined between the outside surface of the upper electrode 16 including its work-engaging surface 18, the inside surface 53 of the top housing 45, and the surface area portion 38 of upper member 12 with top housing 45 against member 12.

As mentioned previously the valves 51B and 51T are electric solenoid operated and have solenoids 54B and 54T and valve elements 55B and 55T which are shown schematically in FIG. 4 within dot-dash lines representing the overall valve.

Figure 2:
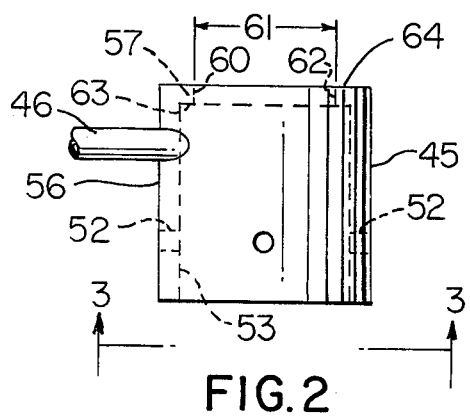
FIG. 2 is a view in elevation of a typical housing member used to surround an associated electrode for the purpose of introducing and confining an inert gas between the housing member and its electrode.
Figure 3:
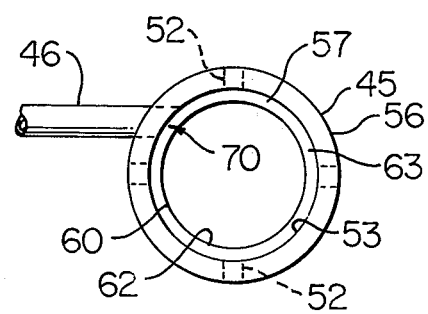
FIG. 3 is a view taken on the line 3—3 of FIG. 2.

Each housing member or housing 45 is made of a suitable electrical non-conductor in the form of an electrical insulating material such as a plastic material and as seen in FIGS. 2-3 has the previously mentioned inside surface 53 in the form of a right circular cylindrical surface, a right circular cylindrical outside surface 56, and an inwardly projecting annular flange 57 defined as an integral part of housing 45. The flange 57 has an opening 60 which has a diameter 61 which is such that it fits concentrically around an associated electrode either 15 or 16 to provide a substantially snug fit therebetween while allowing axial movement of the housing 45 relative to its electrode with minimum escape of inert gas 48 from between such electrode and the inside cylindrical surface 62 of the flange 57.

Each flange 57 supports its associated housing 45 on an associated horn 13 or 14 and as will now be described. In particular, each flange 57 has an inside annular surface 63 and an outside annular surface 64. The surface 63 of the top housing 45 is particularly adapted to engage an associated projection (not shown) on the top electrode 16 or structure associated therewith to precisely control the positioning of the top housing 45 and prevent top housing 45 from falling away from its electrode 16 under conditions when members to be welded are not disposed between the electrodes 15 and 16. A compression spring 68 is provided and acts between a surface of the movable horn and the top housing 45 yieldingly urging same against the above-mentioned projection. Thus, the top housing 45 is supported for limited axial sliding movement relative to its electrode and is carried by movable horn 14 for movement therewith. The bottom housing 45 is supported in a fixed position on its fixed horn 13. In particular, it will be seen that the horn 13 has a spacing member or shim 65 made of a suitable metallic material, such as an aluminum, and the shim is supported on a fixed annular surface 66 of the fixed horn 13. An elastomeric pad 67 preferably made of compressible rubber is provided and supported by the shim 65 and the annular rubber pad 67 supports the bottom housing 45 by supporting annular surface 64 thereon, whereby the shim 65 and rubber pad 67 support the housing 45 in a fixed position.

The rubber pad 67 is used in lieu of a compression spring, or the like, to allow a more precise placement of the members 11 and 12 which are to be welded with outer (to be engaged by the electrode) surfaces in controlled proximity to the working surfaces of the electrodes. The shim 65 is employed to adjust the distance between the bottom surface of the member 11 and the working surface 17 of the bottom electrode 15 and it will be appreciated that the shim 65 may be varied in thickness to compensate for the deviations in electrode length whereby the proper gap is maintained between surface 17 and the bottom surface of the member 11. It will be appreciated that a plurality of comparatively thin shims may be used in lieu of a single shim 65.

As best seen in FIG. 3 of the drawings each supply conduit 46 is connected to its housing 45 so that it enters such housing in fluid flow communication in an off center manner and thus provides a tangential entry of inert gas 48 in the housing 45 and as shown at 70. The tangential entry assures that with the housing 45 installed in position about its electrode the flow of inert gas 48 is provided completely around the housing substantially simultaneously with filling of such housing with the gas.

As previously mentioned each housing 45 has outlet openings 52 therein and in this example four outlet openings are provided. The outlet openings extend substantially radially through the wall of the housing 45 and are provided at a particular axial position along the housing member and are spaced approximately 90° from each other at such axial position. Preferably the outlet openings 52 are disposed at an axial position (with the housing 45 installed in position in the machine 10) which is closer to the superimposed members 11 and 12 than the associated supply conduit 46. The supply conduit 46 is disposed in close proximity to one end of its housing 45, preferably close to the flange 57 thereof, with the outlet openings 52 being disposed close to the opposite end of such housing.

Referring now to FIG. 4, it is seen that the electrical cleaning circuit 20 includes a transformer 72 having primary turns 73 suitably connected to a source of alternating current AC power by leads 74 and 75 and such source may be 480 volts single phase power. The transformer 72 has secondary turns 76 suitably connected to source 77 of high frequency AC power and such source may be of any suitable type known in the art. The high frequency source 77 is connected by suitable electrical leads 80 and 81 to the electrodes 15 and 16 and by an electrical lead 82 to the members 11 and 12 being spot welded. The lead 82 is electrically and mechanically connected to an electrically conductive clamp 79 which in turn engages and provides an electrical connection between lead 82 and members 11 and 12.

The cleaning circuit 20 includes electrical components as illustrated at 83 in FIG. 4 which are suitably connected to a power source by leads 84 and 85 such as a source of 120 volt 60 cycle AC power.

The electrical cleaning circuit 20 is basically automatic in its operation once it is energized and in this example such energization is achieved with a foot switch 86. The electrical cleaning circuit 20 is, in essence, activated by actuating the foot switch 86 whereby high frequency AC power from source 77 is provided (through the action of the circuit illustrated at 83) in a simultaneous manner to the electrodes 15 and 16. However, arc cleaning of electrodes 15 and 16 and associated portions 37 and 38 in the zones 42 and 44 does not commence until a sufficient amount of inert gas 48 is sequentially supplied to such zones. Once sufficient inert gas is supplied to each zone 42 or 44 an associated cleaning arc 87 (FIG. 4) is provided in accordance with this invention, and, after arc cleaning in each zone the components illustrated at 83 energize associated components in the welding machine 10 to thereby energize the welding circuit 19 and provide welding of the superimposed members 11 and 12 in the manner previously described.

Once the foot switch 86 is actuated it serves to energize a foot switch relay 90 having a set of contacts 90A associated therewith. Circuitry at 83 also includes a hold-out timer 91 which holds out the welding operations of the machine 10 for a total time sufficient to allow arc cleaning; and, the timer 91 has an associated set of normally open contacts 91A. The circuitry at 83 also includes a delay timer 92 which delays actuation of a timer 93 through the action of an associated set of contacts 92A. The timer 93 controls the output of the high frequency device 77 by energizing same through a pair of leads 94 and 95 connected therebetween. The circuitry at 83 also includes an arc cleaning timer 96 having sets of contacts 96A and 96B associated therewith with the set of contacts 96A being connected to the bottom cleaning solenoid 54B and the set of contacts 96B being connected to the top cleaning solenoid 54T.

Once the timer 91 times out, it closes its normally open contacts 91A thereby closing same to allow energizing components or devices 101 and 102 provided in the welding machine 10 and operatively connected in the welding circuit 19 to initiate the necessary action to provide spot welding of members 11 and 12. In particular, energizing component 101 causes the movable horn 14 to be moved downwardly by moving means or device 33 to thereby cause housings 45 to compress the rubber pad 67 transmitting force through members 11 and 12 and causing working surfaces 17 and 18 of electrodes 15 and 16 to engage members 11 and 12 respectively. After a time lapse sufficient to move the movable horn 14 in the manner described component 101 activates component 102 through electrical lead 104 and now closed contacts 91A and component 102 in turn activates the welding circuit 19 to provide welding of members 11 and 12 in the manner previously described.

The previously mentioned component 102 is an electrical relay-type component which has a set of normally closed contacts 102A in the circuit with the relay 90; and, after completion of a spot welding operation component 102 operates to momentarily open contacts 102A thereby dropping out relay 90, opening contacts 90A, and timers associated with the cleaning cycle. Once relay 90 drops out, current flow therethrough and through foot switch 86 stops; and, the foot switch 86 is of the type which requires reactuation thereof in order to restart a cleaning cycle.

It will also be appreciated that the electrical circuit may be designed such that instead of providing a foot switch 86 requiring repeated actuation thereof as described above, such circuit may include appropriate components to provide automatic restarting of the cleaning cycle following each spot weld with sufficient time delay before initiation of a cleaning cycle to allow manual or automatic movement of members 11 and 12 such that a new welding spot may be provided therein.

In operation, a pair of metallic members 11 and 12 which are to be welded are supported on the bottom housing 45 thereby providing a controlled bottom gap or space BG between the working surface 17 of electrode 15 and the surface portion 37 of the bottom member 11. The movable horn 14 is then moved by moving device 33 to a predetermined fixed position thereof determined by the particular thickness of members 11 and 12 being welded whereby the top housing 45 is disposed against the top surface of the member 12 with a controlled top gap or space TG which is the same as the bottom space BG, i.e., the spaces or gaps BG and TG are of equal vertical height.

With the members 11 and 12 thus clamped between housings 45 the clamp 83 is clamped in position thereby assuring that once gas 48 is supplied in housings 45 a circuit is completed between the electrodes and members 11 and 12 and high frequency source 77. It will be noted that lead 82 is connected between clamp 83 and source 77 and source 77 is connected to electrodes 15 and 16 by leads 80 and 81.

The cleaning action is commenced once the members 11 and 12 are clamped between housings 45 by operating the foot switch 86 which energizes the foot switch relay 90 closing previously open contacts 90A to thereby energize the hold-out timer 91 and the delay or move timer 92. Energizing the timer 91 causes such timer to keep its normally open contacts 91A open to hold out electrical components 101 and 102 in machine 10 as described previously.

Energizing the timer 92 causes contacts 92A associated therewith to be closed providing current flow through leads 94 and 95 to energize the high frequency source 77 and provide an output which is superimposed over the output of the secondary 76 of the transformer 72 to provide a cleaning arc 87 associated with first electrode 15 and then electrode 16 in a sequential manner as will be described subsequently. Energizing of the timer 92 also assures that the contacts 92A remain closed for a predetermined time increment which is sufficient to provide flow of inert gas 48 to zones 42 and 44.

The closing of contacts 90A by relay 90 also energizes the cleaning timer 96 which controls the action of the solenoid valves 51B and 51T. Once timer 96 is energized it maintains its contacts 96A closed for a predetermined time increment which in turn energizes the bottom cleaning solenoid 54B and opens valve element 55B of valve 51B for such time increment which is sufficient to allow bathing of zone 42 with inert gas 48. As the amount of inert gas 48 becomes sufficient to support initiation of a bottom cleaning arc 87 such arc is self provided between bottom electrode 15 and surface portion 37 resulting in bottom arc 87 cleaning both components in zone 42. The above-mentioned time increment for contacts 96A is sufficient to provide the desired cleaning in zone 42 whereupon timer 96 opens contacts 96A and closes contacts 96B. The inert gas 48 in bottom housing 45 escapes or bleeds through its openings 52 and once most of such gas 48 has bled therefrom, the cleaning action associated with the electrode 15 stops due to the absence of inert gas 48.

However, high frequency electrical power is still being provided by the high frequency device 77 to electrode 16; and, as contacts 96B are closed top solenoid 54T opens valve element 55T of valve 51T commencing flow of inert gas 48 through the top valve 51T to the top housing 45 into zone 44 whereby a similar action as occurred with valve 51B takes place. Namely, once sufficient inert gas 48 flows within the zone 44 the self cleaning action associated with electrode 16 commences and flow of gas 48 is allowed to continue for a predetermined time increment provided by the timer 96. Once flow of inert gas ceases the cleaning action still continues as described earlier until sufficient inert gas has bled from the openings 52 of the top housing to provide self termination of the cleaning of electrode 16 and its surface portion 38. The flow of inert gas 48 through the top valve 51T is controlled for the same time increment as the time increment employed in connection with the bottom valve 51B whereupon the timer 96 times out again opening the contacts 96B to the top cleaning solenoid 54T thereby shutting off power to such solenoid to stop the flow of inert gas 48 through valve 51T. At this point in the cycle the timer 96 returns to its original position.

From the above description it will be seen that the cleaning action is self starting and self stopping essentially as a function of the provision of inert gas first in zone 42 and then in zone 44 which cleaning action lends itself to high speed spot welding, with cleaning between welds at roughly four times the speed of previously proposed arc cleaned spot welders.

Once sufficient time has elapsed to complete the cleaning in zones 42 and 44 timer 91 times out closing its contacts 91A such that components 101 and 102 in the welding machine may initiate and complete the welding operation in the manner previously described. As mentioned earlier, the electrical controls provided in the machine 20, as presently disclosed, require that once a welding cycle is completed it is necessary to actuate the switch 86 in order to restart the cleaning cycle.

From the above description it is therefore apparent that the apparatus 47 of this invention comprising the cleaning means 40 of the spot welding machine 10 includes electrical devices in the electrical cleaning circuit 20 as well as cooperating devices for providing inert gas in a controlled manner as described. Further, it is apparent that such devices include the timers and relays described above which provide substantially automatic operation, the valves 51B and 51T, the unique housings 45 which control the flow and presence of inert gas, and the compressible rubber ring and associated shim means used in lieu of mechanical compression springs.

The specific details of the current which may be employed, the frequency range of the high frequency component 77, the voltage rating and type of welding machine 10 including the various variables which may be present during a welding operation are essentially as presented in the previously mentioned U.S. Pat. No. 3,992,602 the disclosure of which has been incorporated into this application by reference thereto.

As indicated earlier the members 11 and 12 may be made of any suitable metallic material and where such members are made of an aluminous material the inert gas presently preferred for arc-shielding purposes is argon. However, other inert gases may be used, such as a mixture of helium and argon, for example, which are preferably mixed in a volume ratio of three parts helium to one part argon.

The lead 81 is of comparatively high resistance when compared with the leads of the welding circuit or such lead 81 may also have a resistor 81R provided therein whereby during a spot welding operation there is minimal flow therethrough and the welding operation is not adversely affected. It will also be appreciated that, if desired, a set of contacts (not shown) may be provided in line 81 and suitably operated using any known technique such that during a cleaning operation such contacts are closed and during a welding operation the contacts are open preventing any current flow through line 81.

In this disclosure of the invention a compression spring 68 has been described as being used in association with the top housing 45; however, it will be appreciated that, if desired, a suitable yieldable or compressible material similar to rubber pad 67 may be used in lieu of spring 68.

The welding machine 10 has a voltage limiter resistor provided in its welding circuit 19 which assures that during the electrode cleaning action described above there will be no damage to such welding circuit. The voltage limiter resistor may be of any suitable type employed in the art.

While present embodiments of this invention, and methods of practicing the same, have been illustrated and described, it will be recognized that this invention may be otherwise variously embodied and practiced within the scope of the following claims.

What is claimed is:

1. In a resistance spot welding machine wherein two superimposed electrically-conducting members to be joined are received and gripped between two opposed electrodes and then welded together by the flow of electrical current through a welding circuit of which said electrodes and said members form a part; said machine having cleaning means for electrically cleaning said electrodes and surface portions of said members with an inert-gas-shielded electrical arc induced across the work-contacting surface of each electrode and the surface portion of an associated member to be gripped therewith, said cleaing means including an electrical power source having a first terminal connected to said electrodes and a second terminal connected to said members; the improvement which comprises; means comprising a part of said cleaning means for sequentially cleaning said electrodes and said members by alternating the flow of inert gas first between one of said electrodes and a surface portion of the associated member to be gripped with said one of said electrodes, and then between the other of said electrodes and a surface portion of the associated member to be gripped with said other of said electrodes.

2. The improvement of claim 1 in said resistance spot welding machine wherein said welding circuit includes the secondary coil of a transformer which is connected across said electrodes, said welding circuit being activated once said portions are cleaned.

3. The improvement of claim 1 in said spot welding machine in which said means comprising a part of said cleaning means comprises electric solenoid operated valves for flowing inert gas therethrough and electrical components for operating said valves in an automatic sequential cycle.

4. In a resistance spot welding machine having; two opposed welding electrodes; means for relatively moving said electrodes in close proximity to and against a pair of superimposed electrically-conducting members to be welded; an electrical welding circuit connected to said electrodes for inducing an electric current across said electrodes with each electrode disposed against a portion of an outer exposed area of an associated one of said members so as to fuse the faying surfaces of said members at areas intermediate said portions; and means for cleaning each of said portions and electrode associated therewith including first means providing inert gas in a first zone between one of said portions and its electrode and second means providing inert gas in a second zone between the other of said portions and its electrode, and an electrical cleaning circuit operatively connected to said providing means; the improvement which comprises, apparatus comprising a part of said cleaning means for sequentially cleaning said electrodes and said portions by alternating controlled bathing flow of inert gas to said first zone and then to said second zone with said electrical cleaning circuit activated causing cleaning action in each zone to be self starting and ending as a function of the presence of sufficient inert gas therein.

5. In a welding machine as set forth in claim 4 wherein each of said first and second providing means of said cleaning means includes a housing member surrounding its electrode and an inert gas supply line connected to its housing member, the further improvement wherein said apparatus comprises a valve connected in each supply line for controlling flow of inert gas therethrough and wherein said apparatus includes outlet openings in each of said housing members enabling said controlled bathing flow of inert gas between the housing member and its associated electrode by allowing bleeding of inert gas following provision thereof through an associated valve.

6. In a welding machine as set forth in claim 5 the further improvement wherein each of said valves of said apparatus is an electric solenoid operated valve and further comprising electrical devices in said electrical cleaning circuit for sequencing the solenoid valve associated with said first zone and then the solenoid valve associated with said second zone.

7. In a welding machine as set forth in claim 6 the further improvement wherein said electrical devices comprise relay means and timers for sequencing each of said solenoid valves in an automatic manner.

8. In a welding machine as set forth in claim 5 the further improvement wherein said outlet openings comprise four outlet openings provided in each housing member at a particular axial position therealong and spaced approximately 90° from each other at said axial position.

9. In a welding machine as set forth in claim 8 the further improvement wherein each of said supply lines is connected to its housing member to provide a tangential entry of inert gas thereto and thereby provide flow of inert gas completely around the housing member simultaneously with filling same with inert gas.

10. In a welding machine as set forth in claim 9 the further improvement wherein said outlet openings are disposed at an axial position which is closer to said superimposed members than an associated supply line.

11. In a welding machine as set forth in claim 5 the further improvement comprising a compressible elastomeric member and shim means for supporting the housing member of said first providing means so that a top surface of the housing member is positioned a precise distance above its electrode to thereby provide a precise gap between said one portion and the electrode.

12. In a welding machine as set forth in claim 11 the further improvement wherein said compressible member comprises an annular rubber ring.

13. In a method of resistance spot welding utilizing two opposed welding electrodes and comprising the steps of; relatively moving said electrodes in close proximity to and against a pair of superimposed electrically-conducting members to be welded; connecting an electrical welding circuit to said electrodes for inducing an electric current across said electrodes with each electrode disposed against a portion of an outer exposed area of an associated one of said members so as to fuse the faying surfaces of said members at areas intermediate said portions; and cleaning each of said portions and electrode associated therewith employing first means providing inert gas in a first zone between one of said portions and its electrode, second means providing inert gas in a second zone between the other of said portions and its electrode, and an electrical cleaning circuit operatively connected to and cooperating with said providing means to provide said cleaning; the improvement in said cleaning step comprising the steps of, sequentially cleaning said electrodes and said portions by alternating controlled bathing flow of inert gas to said first zone and then to said second zone with said cleaning circuit activated causing cleaning action in each zone to be self starting and ending as a function of the presence of sufficient inert gas therein.

14. In a method as set forth in claim 13 the further improvement wherein said cleaning step comprises providing a housing member in each of said first and second providing means and disposing said housing member around its electrode, connecting an inert gas supply line to each housing member, connecting a valve in each supply line for controlling flow of inert gas therethrough, and providing outlet openings in each housing member enabling said controlled bathing flow of inert gas between the housing member and its associated electrode by allowing bleeding of inert gas from said outlet openings following provision thereof through an associated valve.

15. In a method as set forth in claim 14 wherein each of said valves is an electric solenoid operated valve the further improvement comprising sequencing the solenoid valve associated with said first zone and then the solenoid valve associated with said second zone with electrically operated automatic sequencing devices.

16. In a method as set forth in claim 15 the further improvement wherein sequencing of said solenoid valves is achieved with cooperating relay means and timers.

17. In a method as set forth in claim 14 the further improvement wherein said step of providing outlet openings in each housing member comprises providing said outlet openings at a particular axial position therealong and spaced approximately 90° from each other at said axial position.

18. In a method as set forth in claim 17 the further improvement wherein said step of connecting an inert gas supply line to each housing member comprises connecting each inert gas supply line so it provides a tangential entry of inert gas thereto.

19. In a method as set forth in claim 13 the further improvement comprising alternating controlled bathing flow of inert gas comprising argon.

20. In a method as set forth in claim 14 the further improvement wherein said welding circuit includes a secondary coil of a transformer which is connected across said electrodes with said welding circuit being activated once said portions are cleaned.

* * * * *